US012230001B2

United States Patent
Richter et al.

(10) Patent No.: US 12,230,001 B2
(45) Date of Patent: Feb. 18, 2025

(54) ENCODER, DECODER AND RELATED METHODS

(71) Applicant: Fraunhofer-Gesellschaft zur Förderung der angewandten Forschung e.V., Munich (DE)

(72) Inventors: Thomas Richter, Erlangen (DE); Wolfgang Heppner, Erlangen (DE); Joachim Keinert, Erlangen (DE); Siegfried Fößel, Erlangen (DE); Herbert Thoma, Erlangen (DE); Christian Scherl, Erlangen (DE); Christian Minuth, Erlangen (DE); Bilal Ahmed, Erlangen (DE); Nisha Bhaskar, Erlangen (DE); Heiko Sparenberg, Erlangen (DE)

(73) Assignee: FRAUNHOFER-GESELLSCHAFT ZUR FÖRDERUNG DER ANGEWANDTEN FORSCHUNG E.V., Munich (DE)

( * ) Notice: Subject to any disclaimer, the term of this patent is extended or adjusted under 35 U.S.C. 154(b) by 431 days.

(21) Appl. No.: 17/588,827

(22) Filed: Jan. 31, 2022

(65) Prior Publication Data
US 2023/0230283 A1    Jul. 20, 2023

(30) Foreign Application Priority Data
Jan. 14, 2022   (EP) .................................... 22151672

(51) Int. Cl.
*G06T 9/00*        (2006.01)
*H04N 19/146*   (2014.01)
(Continued)

(52) U.S. Cl.
CPC ............. *G06T 9/00* (2013.01); *H04N 19/146* (2014.11); *H04N 19/18* (2014.11); *H04N 19/186* (2014.11); *H04N 19/60* (2014.11)

(58) Field of Classification Search
CPC ........ G06T 9/00; G06T 9/007; G06T 3/4087; H04N 19/146; H04N 19/18; H04N 19/186;
(Continued)

(56) References Cited

U.S. PATENT DOCUMENTS

| | | | | |
|---|---|---|---|---|
| 4,751,742 A | * | 6/1988 | Meeker | .................. H04N 19/30 375/240.18 |
| 6,125,201 A | * | 9/2000 | Zador | .................. H04N 19/186 382/248 |

(Continued)

FOREIGN PATENT DOCUMENTS

| | | | | |
|---|---|---|---|---|
| FR | 3013490 A1 | * | 5/2015 | ........... H04N 19/124 |
| JP | 3922919 B2 | * | 5/2007 | ........... G06T 3/4084 |

(Continued)

OTHER PUBLICATIONS

"ITU CCITT T.81 9/92 / ISO/IEC 10918-1: 1993(E), Terminal equipment and protocols for telematic services, Information Technology—Digital compression and coding of continuous-tone still images—requirements and guidelines;" Sep. 1992; pp. 1-186.

*Primary Examiner* — Jose L Couso
(74) *Attorney, Agent, or Firm* — McClure, Qualey & Rodack, LLP

(57) ABSTRACT

There is disclosed an encoder, a decoder, related methods, and non-transitory storage units storing instructions which, when executed by a computer, cause the computer to perform the methods.
At an encoder (300), after a spatial transformation stage (304), there is obtained a spatially transformed version (306) of input image information (302) having multiple bands and,
(Continued)

for each band, multiple transform band coefficients. After the generation of precincts (311), each comprising transform coefficients covering a predetermined spatial area of the input image information (302), there is provided a component transformation stage (320, 325), to apply one component transformation (CTr) selected (327) out of a plurality of predetermined component transformations, to each band (102') of each precinct (311). Hence, there is obtained a spatially transformed and color transformed version (323) of the input image information (302), which is subsequently quantized and entropy encoded.

21 Claims, 11 Drawing Sheets

(51) Int. Cl.
H04N 19/18 (2014.01)
H04N 19/186 (2014.01)
H04N 19/60 (2014.01)

(58) Field of Classification Search
CPC .... H04N 19/60; H04N 19/12; H04N 19/1883; H04N 19/63; H04N 19/176; H04N 19/46; H04N 19/136; H04N 19/184; H04N 19/70; H04N 19/122; H04N 19/103; H04N 19/91; H04N 19/124; H04N 19/132; H04N 19/64; H04N 19/154; H04N 19/30; H04N 19/172; H04N 19/645; H04N 19/167; G06V 10/20; G06V 10/50; G06V 10/431; G06F 17/147; H03M 7/40; H03M 7/46

See application file for complete search history.

(56) References Cited

U.S. PATENT DOCUMENTS

| | | | | |
|---|---|---|---|---|
| 6,661,927 B1 * | 12/2003 | Suarez | ........ | H04N 19/132 375/E7.056 |
| 6,865,291 B1 * | 3/2005 | Zador | ........ | H04N 19/63 382/253 |
| 7,454,069 B2 * | 11/2008 | Kodama | ........ | H04N 19/46 375/E7.129 |
| 7,526,133 B2 * | 4/2009 | Nomizu | ........ | G06T 9/007 358/1.15 |
| 7,583,848 B2 * | 9/2009 | Kakii | ........ | H04N 1/4486 380/201 |
| 2002/0131497 A1 * | 9/2002 | Jang | ........ | H04N 19/63 375/E7.041 |
| 2004/0252897 A1 * | 12/2004 | Hara | ........ | H04N 19/1883 375/E7.06 |
| 2008/0031518 A1 * | 2/2008 | Song | ........ | H04N 19/61 382/249 |
| 2008/0199091 A1 * | 8/2008 | Srinivasan | ........ | H04N 19/176 382/239 |
| 2010/0119167 A1 * | 5/2010 | Ikeda | ........ | H04N 19/18 382/248 |
| 2011/0134999 A1 * | 6/2011 | Han | ........ | H04N 19/63 375/240.18 |
| 2016/0173884 A1 * | 6/2016 | Le Leannec | ........ | H04N 19/147 382/166 |
| 2017/0064334 A1 * | 3/2017 | Minoo | ........ | H04N 19/105 |
| 2017/0155905 A1 * | 6/2017 | Puri | ........ | H04N 19/129 |
| 2021/0344921 A1 * | 11/2021 | Kim | ........ | H04N 19/132 |

FOREIGN PATENT DOCUMENTS

| | | | | |
|---|---|---|---|---|
| KR | 2021084634 A | * | 7/2021 | ........ H04N 19/124 |
| WO | WO-2021197158 A1 | * | 10/2021 | ........ H04N 19/129 |

* cited by examiner

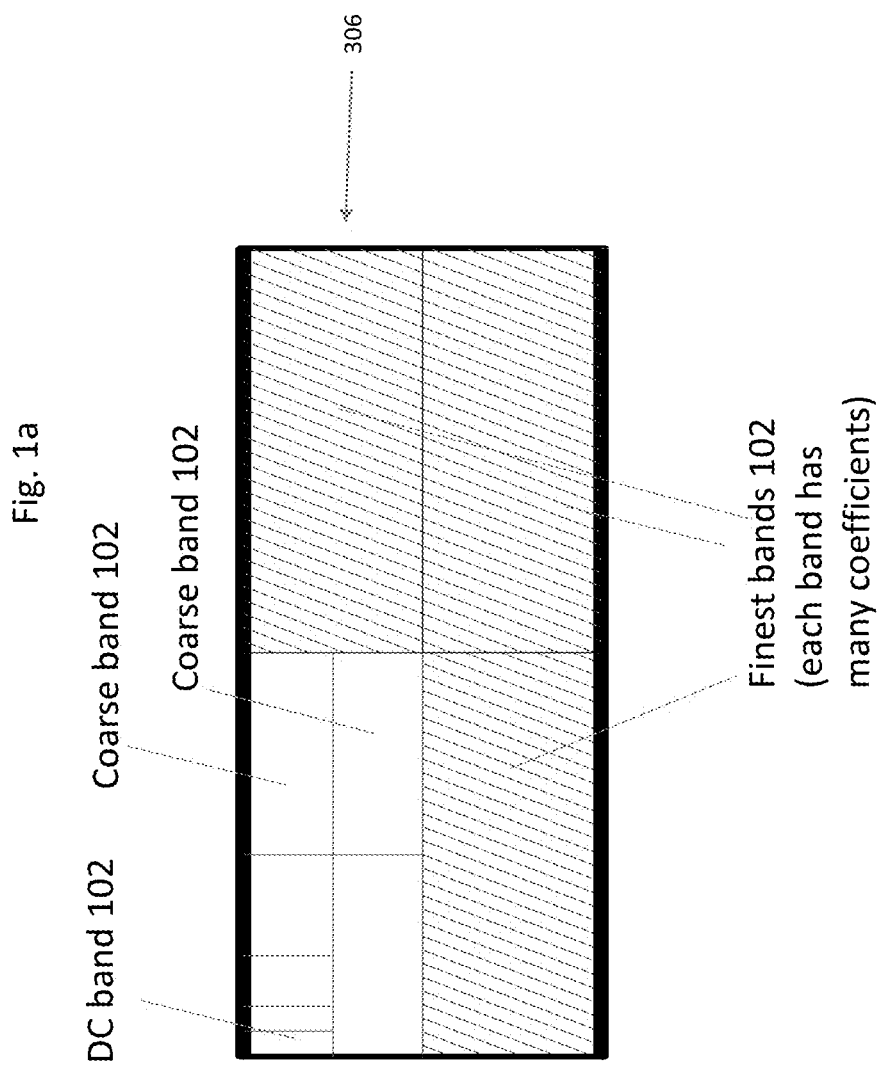

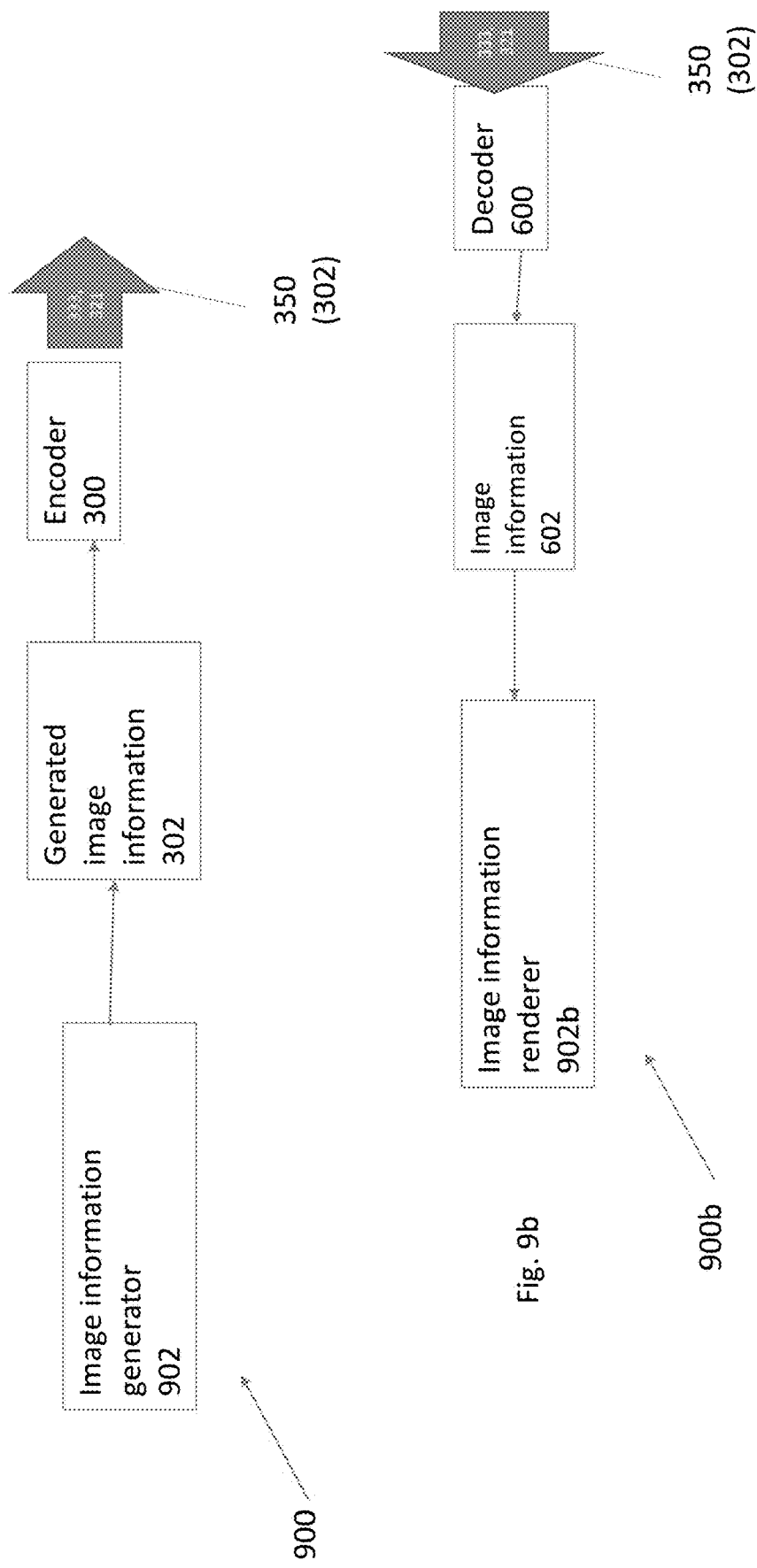

ENCODER, DECODER AND RELATED METHODS

CROSS-REFERENCES TO RELATED APPLICATIONS

This application claims priority from European Patent Application No. EP 22 151 672.7, which was filed on Jan. 14, 2022, and is incorporated herein in its entirety by reference.

TECHNICAL FIELD

The present examples relate to an encoder, a decoder, and related methods for image information. In particular, the technique relate to spatio-frequency modulated color transformation for image information coding.

BACKGROUND

When transmitting sequences of images, such as captured by a camera or as a sequence of screen captures of the desktop of a computer screen, only limited bandwidth is available to transport this information. To address this problem, the image data is compressed in a lossless or lossy way, by first including transformations that exploit both spatial and color correlations across multiple components (such as red, green, blue) within the source data, and then by quantizing and encoding the created coefficients of the decorrelation transformation. Typically, a common global color transformation is applied to all data of the image. It has been noted that, in particular for screen content and computer art, extreme color values are not always efficiently encoded through such technique.

The present examples provide, inter alia, a lightweight method how to replace a common global transformation by a transformation that adapts to the statistics of the color signals, the spatial statistics, as well as to the frequency statistics of the incoming data.

JPEG XS is a lightweight still image compression codec that is particularly designed for low-complexity and low-latency applications, i.e. applications where only limited processing power is available, limited memory is available and image data shall be encoded and decoded only with minimal latency.

As shown in FIG. 2, JPEG XS first applies a common global color transformation ("RCT") 203 to an image 202 that separates red, green and blue components into a luminance component Y, and two color difference coordinates denoted as Cb and Cr. This transformation is followed by a discrete wavelet transformation ("DWT") 204 as spatial decorrelation transformation. It transforms image data into multiple bands, each of which corresponds to image structures of a particular scale, such that the largest bands contain information on the finest structure of the image, and the smallest bands contain information on the coarsest image structures. Transform coefficients are then sorted at 208 into precincts, each of which combines all wavelet coefficients [co] that approximately cover the same spatial area. Following this segmentation, at stage 230 transformed data is then quantized (208) to limited precision, removing irrelevant image content and creating many 0 coefficients. The quantization 208 varies from precinct to precinct, allowing to adapt itself to varying nature of the image content. The quantized data, along with the quantization selected for each precinct, is then entropy coded (202) into a bit-stream 250. Due to quantization of many coefficients into 0s, entropy coding can represent the quantized data efficiently using less bits than in the original image, allowing for compact storage and transmission.

The problem formulated here is traditionally addressed by video codecs such as H.261, H.264 (AVC) or H.265 (HEVC) and also still image codecs such as JPEG (ITU T.81/ISO/IEC 10918-1) or JPEG XS (ISO/IEC 21122-1). In such schemes, data is first transformed from R, G, B into an opponent color space such as Y, Cb, Cr, or such codecs assume that source data is already present in this color space. The image is segmented into blocks, and on these blocks a spatial decorrelation transformation is run. For JPEG XS, a discrete wavelet transformation ("DWT") is used instead.

However, the scheme of FIG. 2 is suboptimal. It is not granted that all the spatial regions of an image are optimally decorrelated by the color decorrelation 203 in the same way. It may be that some regions could be optimally quantized after having been subjected to a particular decorrelation, while other could also be better subjected to a different decorrelation, or maybe not correlated at all.

Hence, the color decorrelation transformation is fixed and thus not sensible to image content. In particular, screen content often includes extreme, e.g. saturated colors that are not well decorrelated by a common global transformation.

Moreover, it has been experienced that the decorrelation 202 as common global transformation is not sensitive to frequency bands either. It has been understood, indeed, that different bands could be subjected to different decorrelations, or that while some bands are better decorrelated using one decorrelation, other bands could be better not decorrelated at all.

SUMMARY

In accordance to an aspect, there is proposed a decoder for decoding an image information from a bitstream, the decoder comprising: a decoding and dequantization stage, to entropy decode, from the bitstream, a quantized version of the image information and to perform a dequantization, to obtain a dequantized version of the image information, wherein the dequantized version of the image information is in transform domain, and includes a plurality of components, and is subdivided into a plurality of precincts, each precinct consisting of, or comprising, transform coefficients covering a predetermined spatial area of the image information; a reverse component transformation stage, to apply one reverse component transformation, to each band, or group of bands, of each precinct, to obtain a reverse component transformed version of the image information, the reverse component transformation being selected out of a plurality of predetermined reverse component transformations based on information on the selected transformation signalled in the bitstream; and a reverse spatial transformation stage to transform the reverse component transformed version of the image information onto a reconstructed spatial image information.

Accordingly, for each band (or group of bands) a particular reverse component may be selected in a bandwise (or groupwise) fashion.

According to an aspect, the reverse component transformation stage may be configured, based on the information on the selected transformation signalled in the bitstream, to select the reverse component transformation out of the plurality of predetermined reverse component transformations and to apply it to at least one group of bands of a particular precinct.

According to an aspect, a first group of bands may include one DC band, and a second group of bands may include all the other bands.

According to an aspect, the reverse spatial transformation stage may be configured to perform a reverse DWT transformation, reverse DCT transformation, or reverse DST transformation for the reverse component transformed version of the image information for each component.

According to an aspect, the plurality of predetermined reverse component transformations may include at least one transformation from an opponent color space onto a color space relative to color primaries. The identity transformation is admitted.

An opponent color space may be understood as a color space which uses at least one coordinate that expresses color differences. An example of an opponent color space is Y, Cb, Cr where "Cb" and "Cr" are the opponent color coordinates as they express blue/yellow and red/green color differences.

According to an aspect, the plurality of predetermined reverse component transformations may include at least one transformation from an opponent color space onto a color space based on coordinates relative to red, green and blue primary colors.

According to an aspect, the plurality of predetermined reverse component transformations may include a plurality of transformations from an opponent color space onto a color space based on coordinates relative to red, green and blue primary colors.

According to an aspect, the plurality of predetermined reverse component transformations may include at least one identity transformation (e.g., in the case in which at the encoder it has been determined as preferable, for a particular band of a precinct, or a particular group of bands of a precinct, to maintain the spatially transformed version of the image information in the original color space e.g. with red, green and blue coordinates).

According to an aspect, the reconstructed spatial image information, as obtained by the reverse spatial transformation stage may be an image or a tile (e.g. a rectangular spatial region of the image information) of an image.

According to an aspect, the reconstructed spatial image information, as obtained by the reverse spatial transformation stage, may be a residual of a temporal prediction in a sequence of images.

In accordance to an aspect, there is proposed an encoder for encoding an input image information into a bitstream, the encoder comprising: a spatial transformation stage, to transform the input image information from a spatial domain onto a transform domain, to obtain a spatially transformed version of the input image information having multiple bands and, for each band, multiple transform coefficients; a precinct generator, to generate precincts, each precinct consisting of, or comprising, transform coefficients covering a predetermined spatial area of the input image information; a component transformation stage, to apply one component transformation, selected out of a plurality of predetermined component transformations, to each band, or group of bands, of each precinct, to obtain a spatially transformed and color transformed version of the input image information; a quantization and coding stage, to quantize the spatially transformed and color transformed version of the input image information, to obtain a quantized version of the spatially transformed and color transformed version of the input image information, and to encode the quantized version of the spatially transformed and color transformed version of the input image information into a bitstream through an entropy coder, and to signal, in the bitstream, information on the selected transformation for each band, or group of bands.

Accordingly, for each band (or group of bands) of each precinct a particular component transformation may be selected in a bandwise (or groupwise) fashion.

According to an aspect, the component transformation stage may be configured to select the component transformation out of the plurality of predetermined component transformations by predictively estimating the quantization for different predetermined component transformations, the selected component transformation being, according to a result of the predictively estimating, the component transformation which minimizes the estimated bitrate contribution of the band to the codestream.

According to an aspect, the component transformation stage may be configured to generate and/or process at least one group of bands for one precinct, and to select the component transformation out of the plurality of predetermined component transformations by predictively estimating the quantization for different predetermined component transformations, the selected component transformation being, according to a result of the predictively estimating, the component transformation which minimizes the estimated bitrate contribution of the group of bands to the codestream.

According to an aspect, a first group of bands may include one DC band, and a second group of bands may include all the other bands.

According to an aspect, the component transformation stage may be configured to predictively estimate bitrate contributions of multiple bands of the same group for different component transformations, and to select the component transformation based on the sum of the bitrate contributions of the multiple bands.

According to an aspect, the encoder may be configured to perform a discrete wavelet transformation (DWT), discrete cosine transformation (DCT), or discrete sine transformation (DST) to each of the components of the input image information, or processed version thereof.

According to an aspect, the plurality of predetermined component transformations may include at least one conversion from a color space relative to primary colors onto an opponent space.

According to an aspect, the color space relative to primary colors may have red, green and blue colors as primary colors.

According to an aspect, the plurality of predetermined component transformations may include at least one identity transformation (e.g., in the case in which at the encoder it has been determined as preferable, for a particular band of a precinct, or a particular group of bands of a precinct, to maintain the spatially transformed version of the image information in the original color space e.g. with red, green and blue color coordinates).

According to an aspect, the input image information may be an image or a tile (e.g. rectangular spatial region) of an image.

According to an aspect, the input image information may be a residual of a temporal prediction in a sequence of images.

According to an aspect, the plurality of predetermined component transformations may include a plurality of transformations from a primary color space on coordinates relative to red, green and blue primary colors onto an opponent color space.

In accordance to an aspect, there is proposed a method for decoding an image information from a bitstream, the method comprising: a decoding and dequantization step, comprising entropy decoding, from the bitstream, a quantized version of the image information, and performing a dequantization, to obtain a dequantized version of the image information, wherein the dequantized version of the image information is in transform domain, and includes a plurality of components, and is subdivided into a plurality of precincts, each precinct having transform coefficients covering a predetermined spatial area of the image information; a reverse component transformation step, comprising applying one reverse component transformation, to each band, or group of bands, of each precinct, to obtain a reverse component transformed version of the image information, the reverse component transformation being selected out of a plurality of predetermined reverse component transformations based on information on the selected transformation signalled in the bitstream; and a reverse spatial transformation step comprising transforming the reverse component transformed version of the image information onto a reconstructed spatial image information.

In accordance to an aspect, there is proposed a non-transitory storage unit storing instructions which, when executed by a computer, cause the computer to perform: a decoding and dequantization step, comprising entropy decoding, from the bitstream, a quantized version of the image information, and performing a dequantization, to obtain a dequantized version of the image information, wherein the dequantized version of the image information is in transform domain, and includes a plurality of components, and is subdivided into a plurality of precincts, each precinct consisting of, or comprising, transform coefficients covering a predetermined spatial area of the image information; a reverse component transformation step, comprising applying one reverse component transformation, to each band, or group of bands, of each precinct, to obtain a reverse component transformed version of the image information, the reverse component transformation being selected out of a plurality of predetermined reverse component transformations based on information on the selected transformation signalled in the bitstream; and a reverse spatial transformation step comprising transforming the reverse component transformed version of the image information onto a reconstructed spatial image information.

In accordance to an aspect, there is proposed a method for encoding an input image information into a bitstream, the method comprising: a spatial transformation step, comprising transforming the input image information from a spatial domain onto a transform domain, to obtain a spatially transformed version of the input image information having multiple transform coefficients; a precinct generator step, comprising generating precincts, each precinct having transform coefficients covering a predetermined spatial area of the input image information; a component transformation step, comprising applying one component transformation, selected out of a plurality of predetermined component transformations, to each band, or group of bands, of each precinct, to obtain a spatially transformed and color transformed version of the input image information; a quantization and coding step, comprising quantizing the spatially transformed and color transformed version of the input image information, to obtain a quantized version of the spatially transformed and color transformed version of the input image information, and encoding the quantized version of the spatially transformed and color transformed version of the input image information into a bitstream through entropy coding, and signalling, in the bitstream, information on the selected transformation for each band, or group of bands.

There is also provided a bitstream encoding an image information, the bitstream being encoded using the encoding method above.

In examples (both regarding encoding and decoding), different bands (e.g. of the same precinct) may be subjected to different component transformations (e.g. a first component transformation may be applied to a first band or a first group of bands, while a second component transformation may be applied to a second band or a second group of bands). The selection may be performed per band (or per group of bands), so that for different bands (e.g. of the same precinct and/or of different precincts) different selections are performed. For each band of each precinct, one selection is performed, while for another band (of the same precinct or of a different precinct) another selection may be performed.

In accordance to an aspect, there is proposed a non-transitory storage unit storing instructions which, when executed by a computer, cause the computer to perform: a spatial transformation step, comprising transforming the input image information from a spatial domain onto a transform domain, to obtain a spatially transformed version of the input image information having multiple bands and, for each band, multiple transform coefficients; a precinct generator step, comprising generating precincts, each precinct consisting of, or comprising, transform coefficients covering a predetermined spatial area of the input image information; a component transformation step, comprising applying one component transformation, selected out of a plurality of predetermined component transformations, to each band, or group of bands, of each precinct, to obtain a spatially transformed and color transformed version of the input image information;

a quantization and coding step, comprising quantizing the spatially transformed and color transformed version of the input image information, to obtain a quantized version of the spatially transformed and color transformed version of the input image information, and encoding the quantized version of the spatially transformed and color transformed version of the input image information into a bitstream by entropy coding, and signalling, in the bitstream, information on the selected transformation for each band, or group of bands.

FIGURES

FIGS. 1a, 1b and 1c show examples of image information, bands and precincts.

FIG. 9a shows an example of image information generator system.

FIG. 9b shows an example of image information renderer system.

EXAMPLES

In the framework of transform-based image compression, a filter and spatially adaptive color transformation is, inter alia, proposed. While traditional designs apply a static color transformation on data in the spatial domain, in the proposed design the color transformation is applied after the decorrelation transformation, and the segmentation of the transformed data into spatially independent units (precincts). In each precinct, an approximate analysis may be run which selects the color transformation from a set of candidate transformations that provides ideal compression performance (for example, the analysis may take into consideration the amplitude of the coefficients for each band of each precinct, after transformation). The index, or more in general the information of the selected component transformation, of this transformation is then embedded into the compressed data.

Figure 1B:
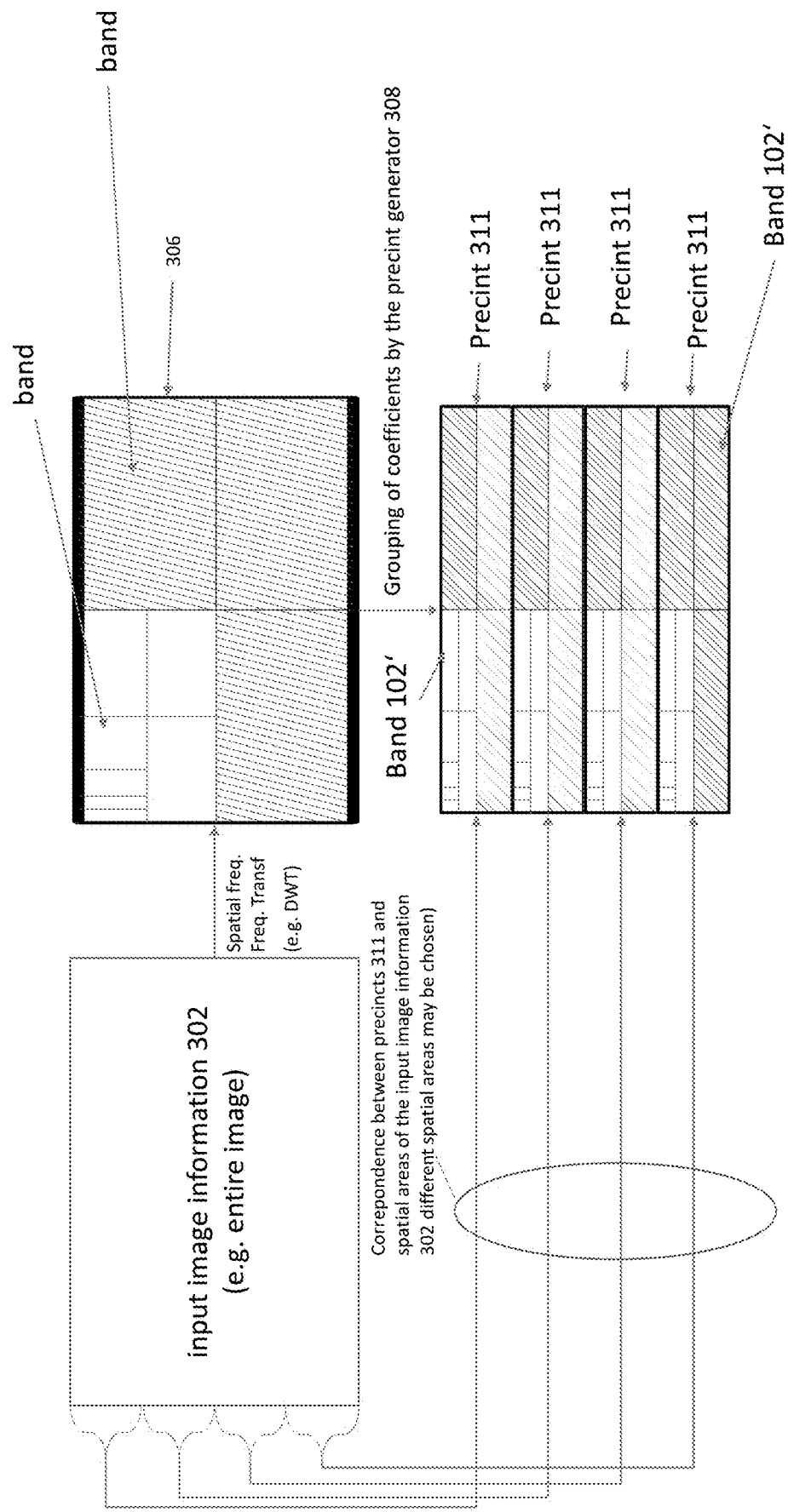
Figure 1C:
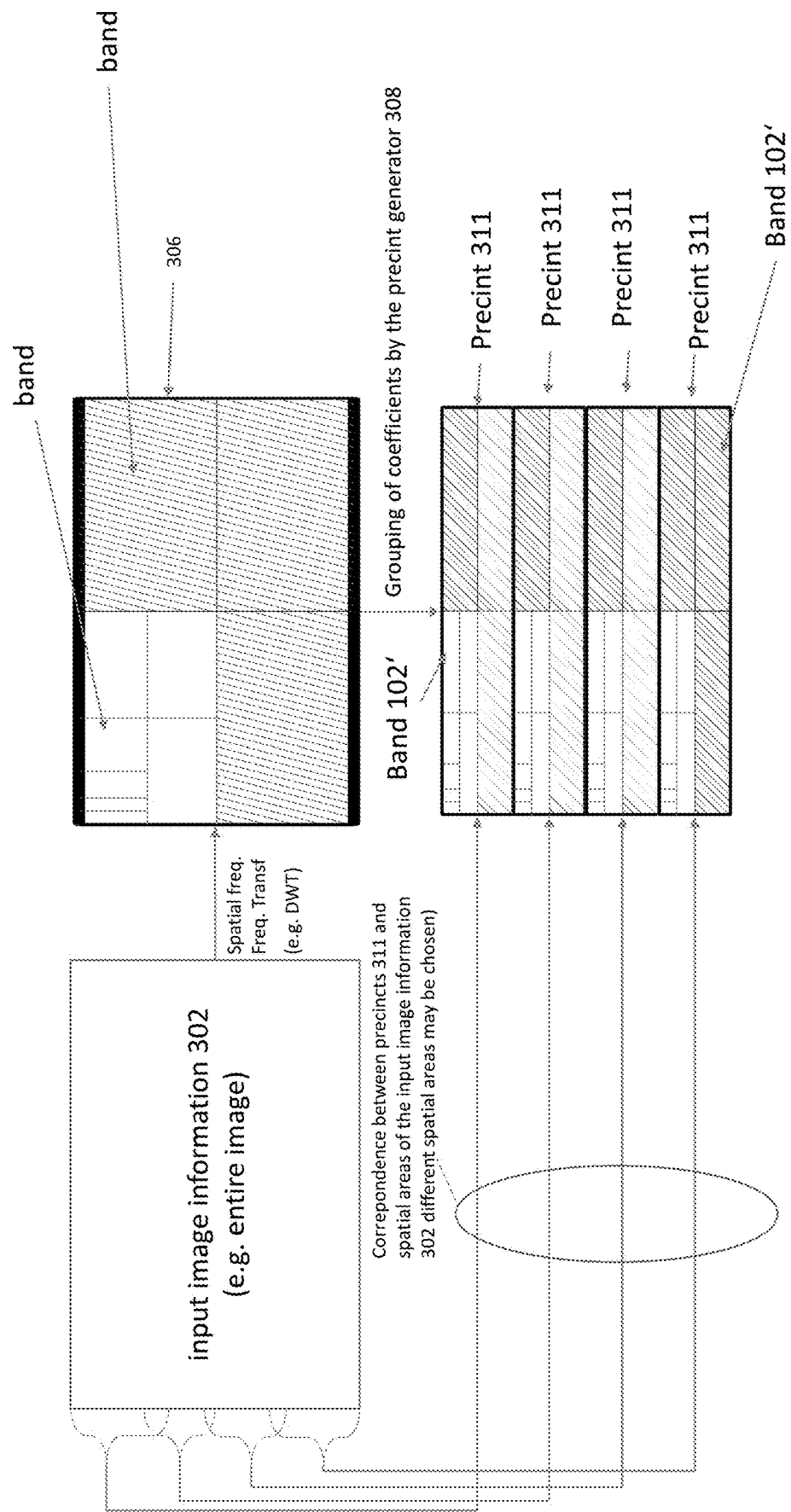
Figure 2:
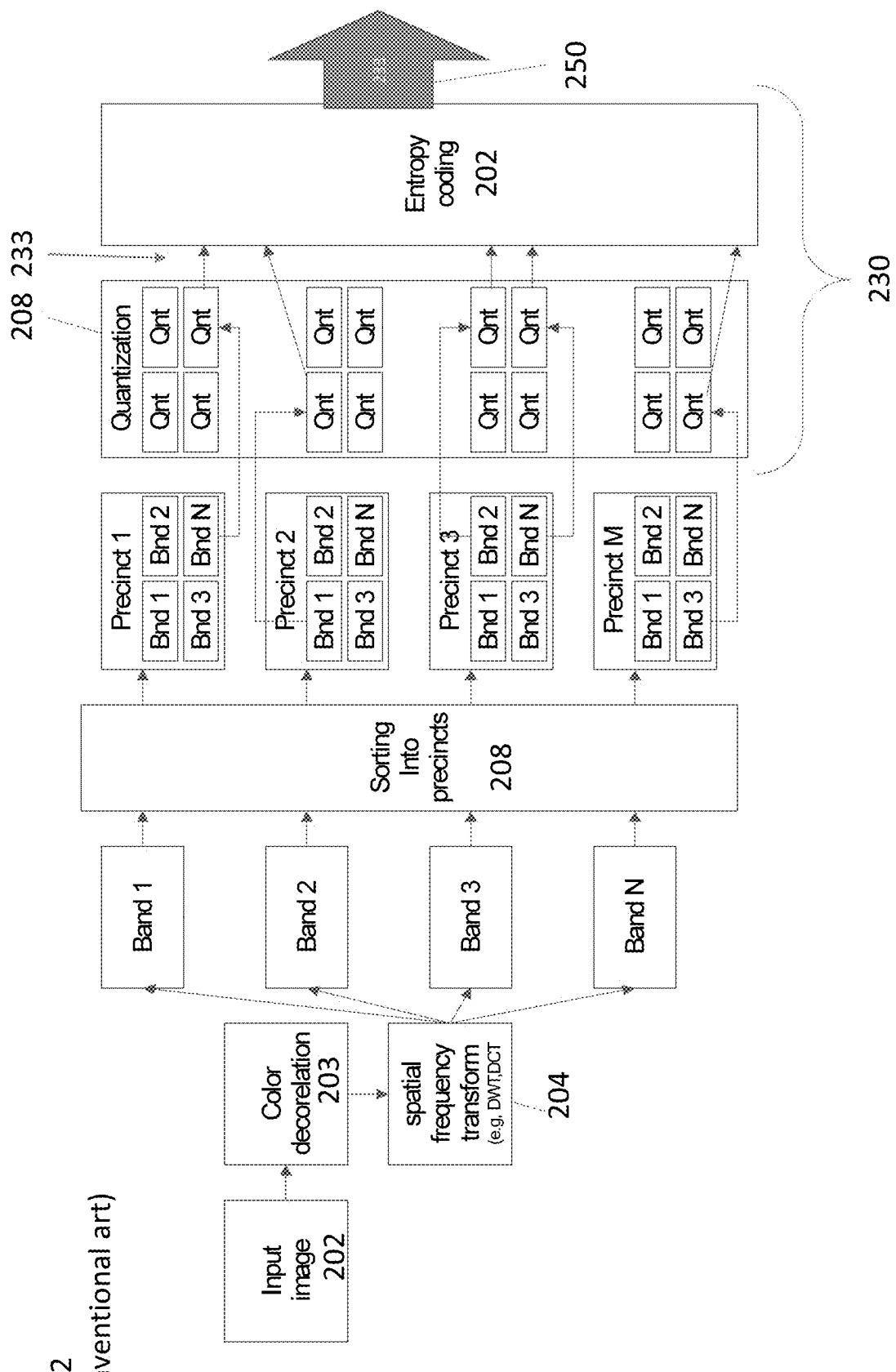
FIG. 2 shows an encoder according to the prior art.

An input image information 302 (e.g. input image) is schematized in FIGS. 1a, 1b and 1c. The input image information 302 may be an image or a residual (e.g. a residual of a temporal prediction in a sequence of images), e.g. in a video sequence of images. The input image information 302 may be in the spatial domain, and may be defined in a matrix (e.g. bidimensional array) or another tensor of pixels, each entry of the matrix (or more in general tensor) being providing information (e.g. visual information) on a pixel. In FIGS. 1a, 1b, and 1c, the ordinate and abscissa of the image information 302 may correspond to the ordinate and abscissa of the image in the spatial domain, for example. The input image 302 may also be a tile (e.g. rectangular spatial region) of an image in the spatial domain.

In the spatial domain, the input image information 302 has a plurality of components (e.g. color components), such as red, green, blue (different colors are possible) according to a color space. Each element be a vector (e.g. 3-tuple), and each component may be an element of the vector. Each entry of the vector may indicate a particular value (e.g., between 0 and 255, in particular when encoded in one byte), thereby providing a scale of the particular component (e.g. 0 meaning no presence of the color component, 255 meaning full tonality, in case of the resolution being in 8 bits, but different resolutions are possible, e.g. with more than 8 bits, e.g. 16 bits, or different numbers of bits). This is valid both when the image information 302 is an image, and when the image information 302 is a residual image.

There would be, similarly to other existing designs, the possibility of performing a color decorrelation on the image information 302 (e.g. to transform the image information 302 from a color spaced based on red, green, blue primary colors to an opponent color space). However, in the context of the present examples, this is avoided.

A spatial transformation stage 304 is applied to the image information 302, to transform the input image information 302 from the spatial domain onto a transform domain, to obtain a spatially transformed version 306 of the input image information 302. The spatially transformed version 306 of the input image information 302 has multiple bands 102. The spatial transformation may be a discrete wavelet transformation (DWT). The spatial transformation may be a discrete sine transformation (DST). The spatial transformation may be a discrete cosine transformation (DCT). The above list is only presented as an example and is not exhaustive, that is, other spatial transformations may be chosen.

For example, the image information 302 may be filtered using a plurality of filters, each filter generating a band (e.g. there may be eight filters, generating eight bands, just to say a number, but a plurality of filters may be used), each band having a plurality of coefficients.

In examples (e.g. when DWT, DCT, or DST is applied), the input image information 302 may be transformed into multiple bands 102, each of which may correspond to image structures of a particular scale, such that the largest bands contain information on the finest structure of the input image information 302, and the smallest bands (e.g. one DC band) contain information on the coarsest image structures.

The spatial transformation stage 304 may be instantiated for each component (e.g. once for red, once for green, once for blue), e.g. independently from each other. Therefore, the spatially transformed version 306 of the input image information 302 may have a plurality of bands 102 for each component. In examples, if the input image information 302 has 320×200 pixels and if each pixel is a 3-dimensional vector relative to color primaries of the color space of the input image, the spatially transformed version 306 of the input image information 302 may consist of 320*200*3 pixel values. In this example, its output would also consist of 320*200*3 transform coefficients. If, as an example, the spatial decorrelation transformation consists of 8 filters and thus creates 8 bands per component, and as each transform coefficient is a member of one band created by the spatial decorrelation transformation, 8 bands consisting of 3-dimensional vectors of transform coefficients are created, and the total number of coefficients in all bands in this example adds up to 320*200*3 coefficients, or equivalently to 320*200 3-dimensional coefficient vectors.

Notably, the transform coefficients in the spatially transformed version 306 of the input image information 302 is in color coordinates relative to the color space of the input image, for example relative to red, green, blue primary colors.

Each of FIGS. 1a, 1b and 1c shows a spatially transformed version 306 of an input image information 302 (for one color component) and a subdivision in bands 102.

The spatially transformed version 306 of the input image information 302 may be processed to generate precincts 311 by a precinct generator 308. Each precinct 311 consists of those transform coefficients 102' that cover a predetermined spatial area of the input image information 302 such that each transform coefficient is the member of exactly one precinct and such that each precinct contains coefficients of a plurality of bands. The set of precincts 311 as generated by the precinct generator 308 covers the entire the spatially transformed version 306 of the input image information 302.

The grouping of coefficients into precincts is such that a precinct 311 corresponds to a region (or to an approximate region) of the input image information 302 in the spatial domain that would be obtained by reversely transforming the transform coefficients of the precinct 311. Depending on the transformation chosen, for example the discrete wavelet transformation (DWT), the regions obtained by inversely transforming the precincts back into the transform domain may be fuzzy, and their edge may appear blurred. In FIGS. 1b and 1c there is shown a correspondence between a subdivision into precincts 311 with the spatial regions to which they correspond. Even if in FIG. 1b the spatial region are shown as having clearer edges, they can present some fuzziness and can overlap, like in FIG. 1c (in which overlapping areas are present). Non-overlapping areas can be obtained, for example, when using DCT. FIGS. 1b and 1c shows four precincts 311 which are generated for one color component of the spatially transformed version 306 of the input image information 302. With reference to FIG. 1b and FIG. 1c, each precinct 311 may include a plurality of bands 102, but not all transform coefficients from each band 102. In the particular case of FIGS. 1b and 1c, each precinct 311 includes those transform coefficients from all bands 102 that correspond to approximately one rectangular region of the image, in the example of FIGS. 1b and 1c, precincts 311 separate the image into four spatial regions. In the examples of FIGS. 1b and 1c, a precinct 311 extends over the full width of the image, but not the full height, but that is very specific to the particular subdivision.

Figure 3:
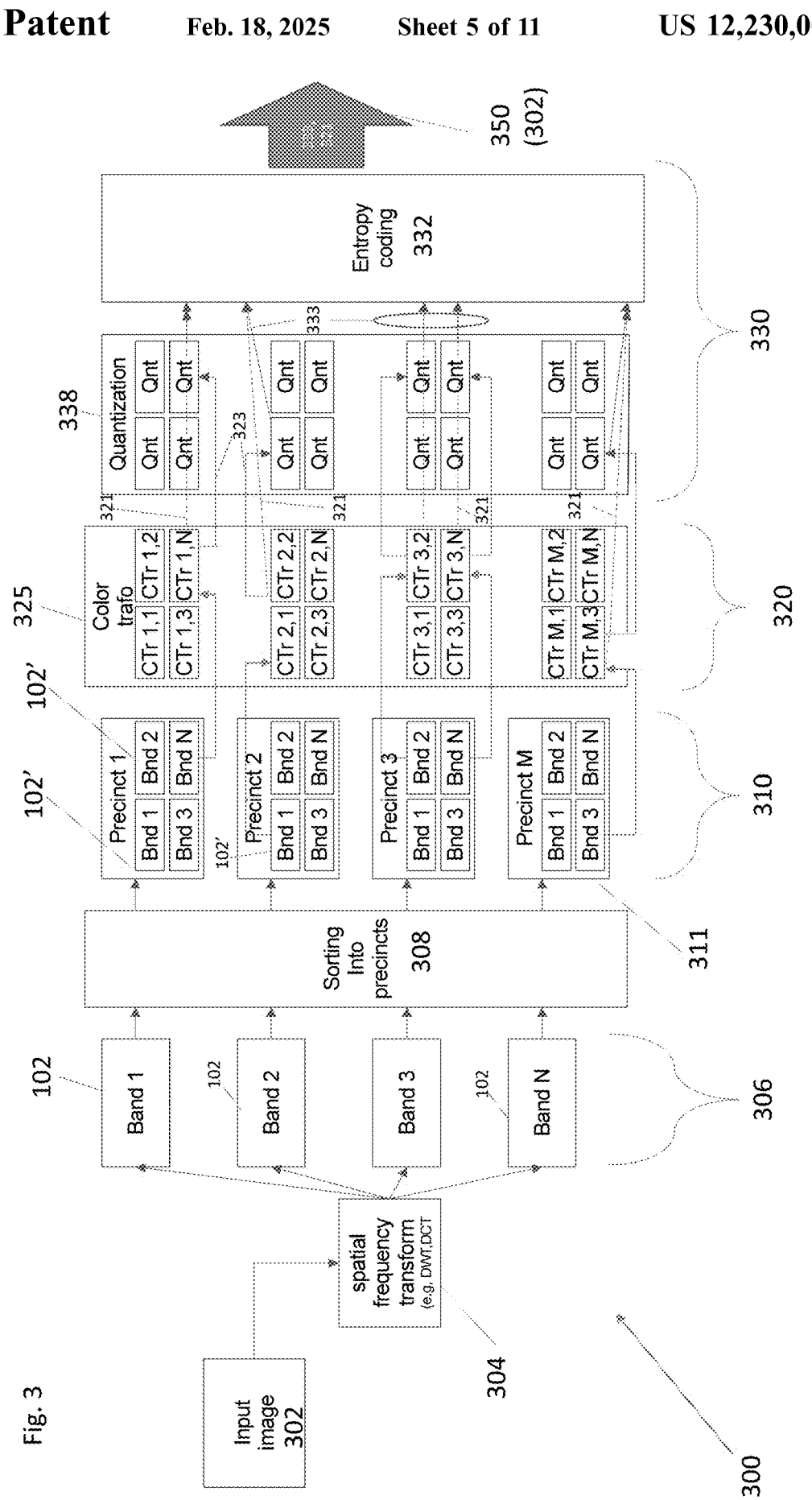
FIGS. 3 and 4 show an encoder according to an example.

FIG. 3 shows that the spatially transformed version 306 of the input image information 302 may be therefore subjected to a subdivision into precincts 311, the spatially transformed version of the input image information 302 (as divided into precincts 311) being indicated with 310.

At this point, for each band 102' of each precinct 311, it is possible to apply a component transformation 325 at component transformation stage 320.

The component transformation 325 applied to bands 102' of each precinct 311 may be selected out of a plurality of component transformations. The purpose of the component transformations may be to obtain a color decorrelation for each band of each precinct. The identity transformation may be one of the admissible component transformations. For example, there may be a selection between:

a. An identity transformation, which maintains, for a particular band 102' of a particular precinct 301, the same values of the color components of the spatially transformed version 306 of the input image information 302. Equivalently, no component transformation is performed.

b. At least one transformation onto chroma/luma components (opponent color space), or more in general onto a one-dimensional luminance space, and a bidimensional chrominance spaces (R,G,B→Y,Cb,Cr), to obtain a three-dimensional space.

c. There may be other transformations, in addition or alternative.

(In an opponent color space, at least one coordinate, e.g. two coordinates, are used that express color differences. An example of an opponent color space is Y Cb Cr where "Cb" and "Cr" are the opponent color coordinates as they express blue/yellow and red/green color differences.)

The color component transformation 325 (R,G,B→Y,Cb, Cr) may be reversible or irreversible.

An example color component transformation 325 into an opponent color space (R,G,B→Y,Cb,Cr) is:
Cb=B−G
Cr=R−G
Y=G+⌊(Cb+Cr)/4⌋
where ⌊ . . . ⌋ indicates the floor function (rounding to the largest integer number smaller or equal than the input)

Another example for a transformation into an opponent color space may be:
Cb=⌊B−3*G/4⌋,
Cr=R−G
Y=G+⌊(Cb+Cr)/4⌋

Another example for a transformation into an opponent color space may be:
Cr=⌊R−3*G/4⌋
Cb=B−G
Y=G+⌊(Cb+Cr)/4⌋

Therefore, from the component transformation stage 320 and downstream thereto, the input image information 302 is transformed onto a spatially transformed and color transformed version 323. The component transformation 325 is instantiated once for each band 102' of each precinct 311. This is why in FIG. 3 there is shown, in block 325, different transformations:

$CTr1,1$ corresponds to the band 1 ($Bnd1$) of the precinct 1

$CTr1,2$ corresponds to the band 2 ($Bnd1$) of the precinct 1

...

$CTr1,N$ corresponds to the band $N$ ($BndN$) of the precinct 1

$CTr2,1$ corresponds to the band 1 ($Bnd1$) of the precinct 2

...

$CTr2,N$ corresponds to the band $N$ ($BndN$) of the precinct 2

...

$CTrM,N$ corresponds to the band $N$ ($BndN$) of the precinct $M$

It is to be noted, however, that the spatially transformed and color transformed version 323 of the input image information 302 is in the space defined by the particular component transformation selected for the particular band 102' of the particular precinct 311.

Different bands 102' in the same or in a different precinct 311 may be subjected to the same transformation or to a different transformation, which is not predetermined. A priori, it is not pre-established whether the transformation CTr1,1 will be of a type, whether the transformation CTr1,2 is of another type, and so on. The instantiation CTr1,1 of the component transformation 325 may be an identity transformation (and the instantiation of the spatially transformed and color transformed version 323 of the input image information 302 may be in a color space with red, green and blue primary colors, for example), while the instantiation CTr1,2 of the component transformation 325 may be an transformation onto chroma/luma (and the instantiation of the spatially transformed and color transformed version 323 of the input image information 302 may be in an opponent color space, for example). Therefore, to each band (or each group of bands) of each precinct there may be assigned one related component transformation, while the other (non-selected) component transformations may be deactivated for that band (or group of bands). A bandwise selection (or groupwise selection) may therefore be performed.

For each band 102' and each precinct 311, there may be output by the component transformation stage 320 information 321 on the selected transformation, indicating which color transformation is selected for each band 102' and each precinct 311.

The spatially transformed and color transformed version 323 of the input image information 302 may be provided to a quantization and coding stage 330, to quantize (at the quantization stage 338) the spatially transformed and color transformed version 323 of the input image information 302. The quantization and coding stage 330 may quantize the spatially transformed and color transformed version 323 of the input image information 302, thereby obtaining a quantized version 333 of the spatially transformed and color transformed version of the input image information 302. The quantization and coding stage 330 may encode the quantized version 333 of the spatially transformed and color transformed version 323 of the input image information 302 into a bitstream 350 through an entropy coder 332. The quantization and coding stage 330 may signal, in the bitstream 350, the information 321 on the selected transformation in association with each band 102', or group of bands.

The quantization 338 may define a division of the spatially transformed and color transformed version 323 of the input image information 302 by an appropriated denominator A, so that an integer version of the result of the division is encoded as quantized version 333 of the spatially transformed and color transformed version of the input image information 302, where information on the denominator A may also be signalled in the bitstream 350. Since the integer versions of many results of the divisions will happen to be 0 (zero), after the entropy encoder 332 will use a more compact representation for those 0 results in the bitstream 350 (in some cases it may happen that some 0s are not encoded in the bitstream), thereby saving bitrate. Other ways of performing the quantization 332 and the entropy coding 332 may be used.

Hence, the bitstream 350 may include at least one of, or at least two of, or all of:
- a quantized version 333 of the spatially transformed and color transformed version of the input image information 302;
- information on the denominator A for each band and each precinct;
- information 321 on the selected component transformation (selected color transformation) in association with each band 102' or group of bands (i.e., bandwise or groupwise).

Figure 4:
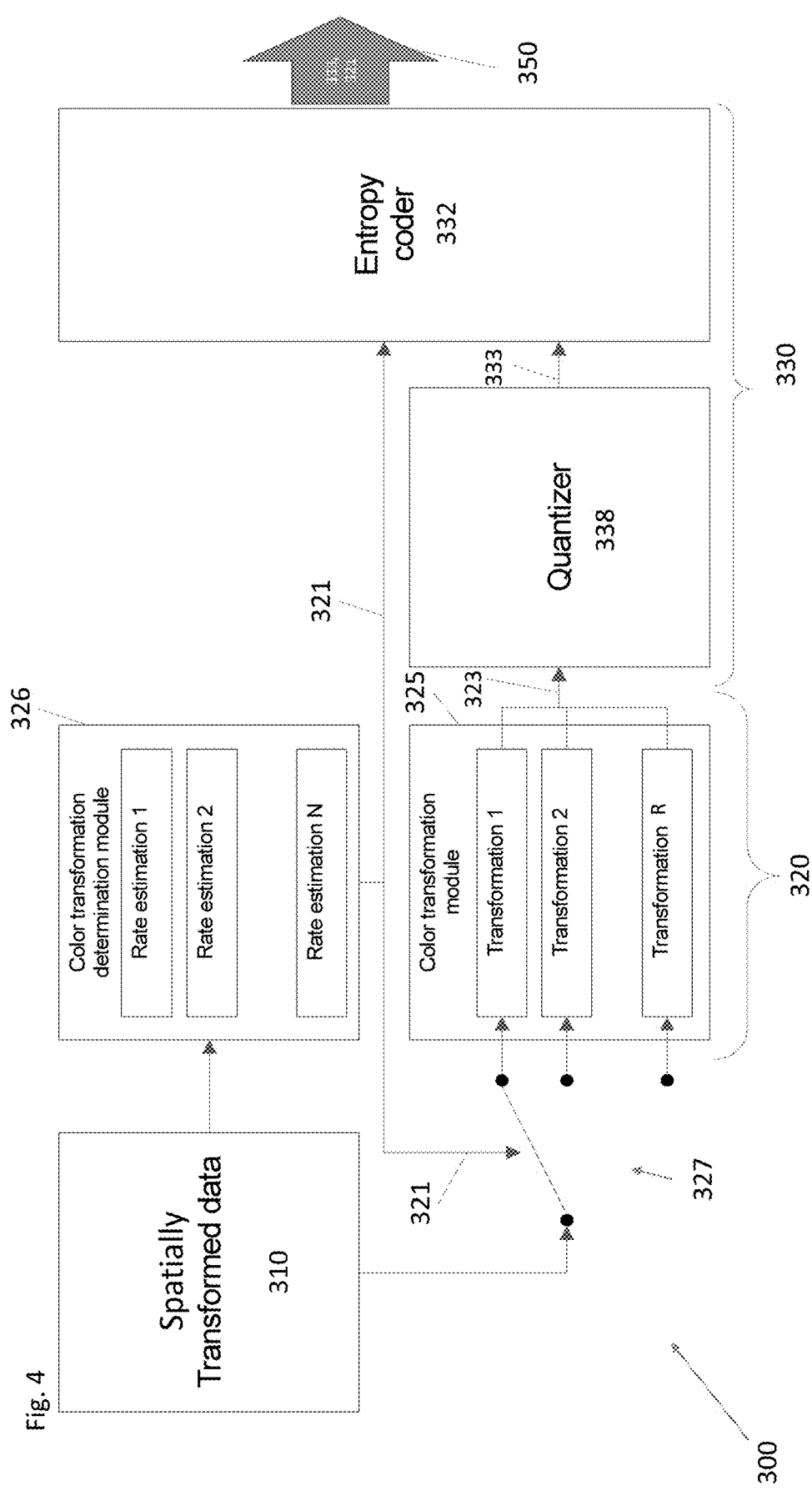

FIG. 4 shows the encoder 300 in which the selection of the particular component transformation is shown. The processed version 310 of the image information 302 (as output by the precinct generator 308) is provided to the component transformation stage 320 (as also shown in FIG. 3). A selector 327 (which may be part of the component transformation stage 320) represents the selection of the particular component transformation among the plurality of R selectable candidate component transformations.

The selector 327 is shown as being controlled by a component transformation determination module 326. The component transformation determination module 326 may choose the component transformation out of the plurality of predetermined component transformations (CTr). The component transformation determination module 326 may predictively estimate the bitrate adaptive quantization that will be performed by the quantizer stage 338. For example, the component transformation determination module 326 may estimate, for different predetermined component transformations (CTr), the bitrates due to the available choices for the component transformation. The component transformation determination module 326 may, for example, predictively estimate which component transformation (candidate component transformation) minimizes the bitrate contributions (rate contributions) for the particular band 102' of the particular precinct. The result of the control of the selector 327 by the component transformation determination module 326 is indicated also with 321, since it is basically information on the selected transformation in association, which is to be signalled in the bitstream 350. The component transformation determination module 326 may therefore operate its choice for each band 102' (or group of bands) of each precinct 311, in a bandwise (or groupwise) fashion.

FIG. 4 shows also a component transformation module (color transformation module) 325 which performs the particular transformation chosen for the band 102' of the precinct 311. In the component transformation module 325 the "Transformation 1" may be the "identity transformation" (and its output may be in a color space, e.g. a color space relative to red, green and blue primary colors, for example), and/or the "transformation 2" may be a transformation into an opponent color space (and its output 323 may be in a Y, Cb, Cr space, for example). The component transformation module 325 may therefore operate its transformation for each band 102' (or group of bands) of each precinct 311, in a bandwise (or groupwise) fashion.

Some distinctions between the quantization predictive estimation at module 326 and the real quantization at quantization stage 338 are here discussed. The spatially transformed, component transformed coefficients 323 are input to the quantization stage 338, but the way how the quantization stage 338 operates may in general be independent of the actual component transformation chosen. Quantization (338) can imply dividing each coefficient by a number (e.g. A, as above), while this number is dependent on the band 102' in the precinct 311 for the component the coefficient is located in.

In some examples, the output bitrate of entropy coding (332) and quantization (338) is not available to the color transformation determination module (326). In such a case, the color transformation determination module (326) may predictively estimate the rate (bitrate) contribution of the spatially transformed data (310) generated through entropy coding. Such an estimate may (in some examples) be generated by summing the absolute values of the transform coefficients subjected to the candidate color transformation. In other examples, it may be generated by taking into account the number of populated bitplanes of groups of transform coefficients. The color transformation determination module (326) may, in the above examples, select the component transformation for which the sum of absolute values is minimal, or for which the sum of populated bitplanes of coefficient groups is minimal. This is not exhaustive and presents possible examples how such an estimate may be generated without performing quantization (338) and entropy coding (332).

The quantization predictive estimation at module 326 may then select for each band 102' of each precinct 311 the component transformation with the (predicted) lowest achievable rate, and apply it to the data 310 (spatially transformed version of the input image information 302 after being divided into precincts 311). The component transformation module 325 may therefore operate its transformation for each band 102' (or group of bands) of each precinct 311, in a bandwise (or groupwise) fashion.

The information 321 on which component transformation has been selected is written by the entropy coder 338 into the output bitstream 350.

Figure 7:
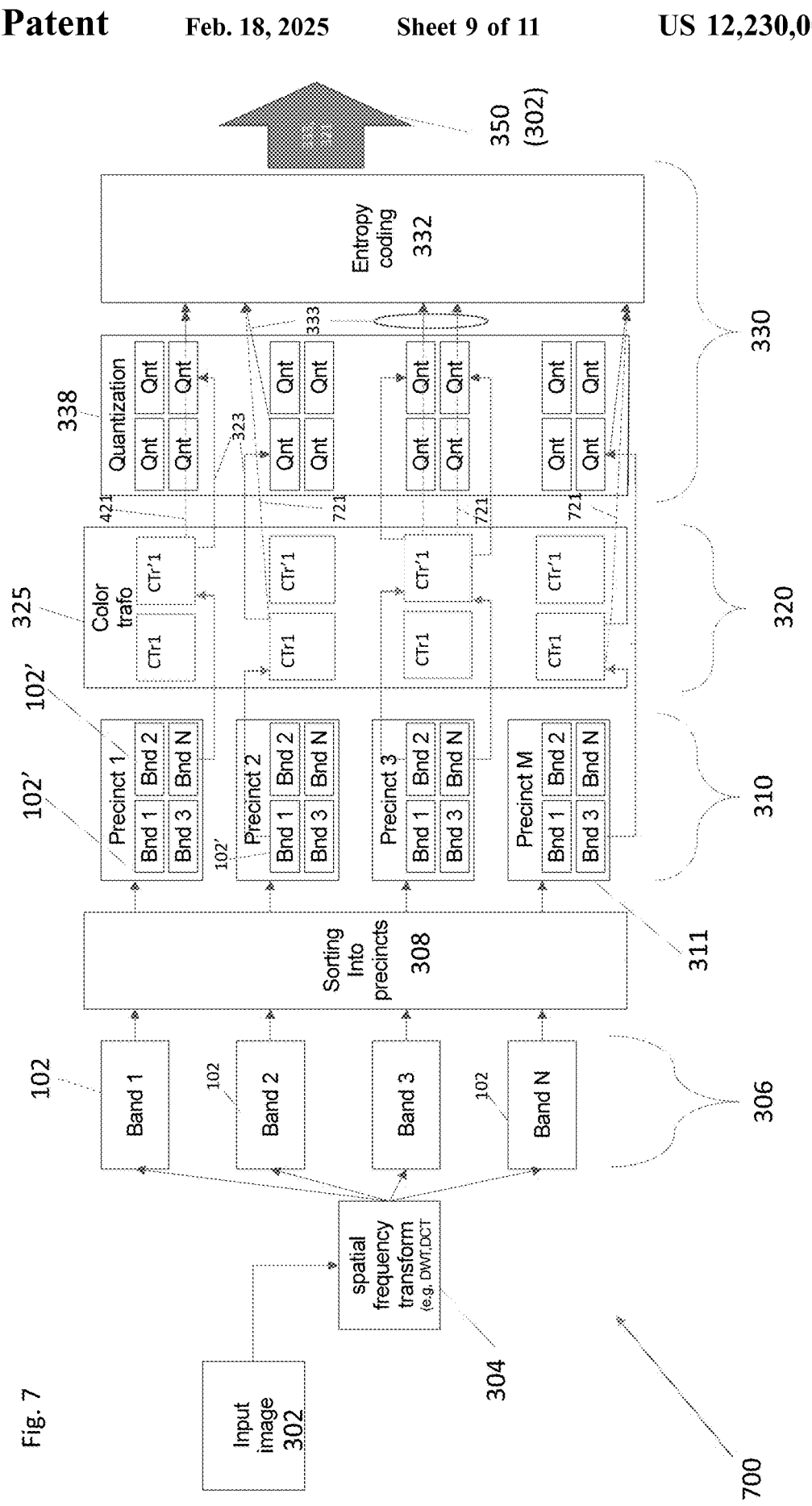
FIG. 7 shows an example of an encoder according to an example.

FIG. 7 shows a variant 700 of the encoder 300. In encoder 300, the bands 102' of each precinct 311 are grouped in groups of bands (e.g. two groups of bands or at least two groups of bands), each group of bands having one band or a plurality of bands, and the selection of the particular component transformation is carried out groupwise. Therefore, all the bands of each group of bands are transformed using the same transformation. This is advantageous, since the information 321 on the selected transformation is signalled in the bitstream 350 jointly. For example, if the selection is out of two transformations, then one single bit is required for each group of bands. In one example, for each band 102' of each precinct 311, there are defined two groups of bands:
- A first group of bands (CTr1, CTr2, CTr3, CTr4) having only one single DC band; and
- A second group of bands (CTr'1, CTr'2, CTr'3, CTr'4) having all the remaining groups of bands.

In some examples, whether the bands 102' are grouped or not grouped (and, in case they are grouped, which are the groups of bands), may be signalled in the bitstream 350, or, alternatively, it may be pre-established, without necessity of signalling in the bitstream. For example, the subdivision between a first group of bands (e.g. having only one single DC band) and a second group of bands (e.g. having all the remaining groups of bands) may be pre-established, without necessity of signalling.

Figure 5:
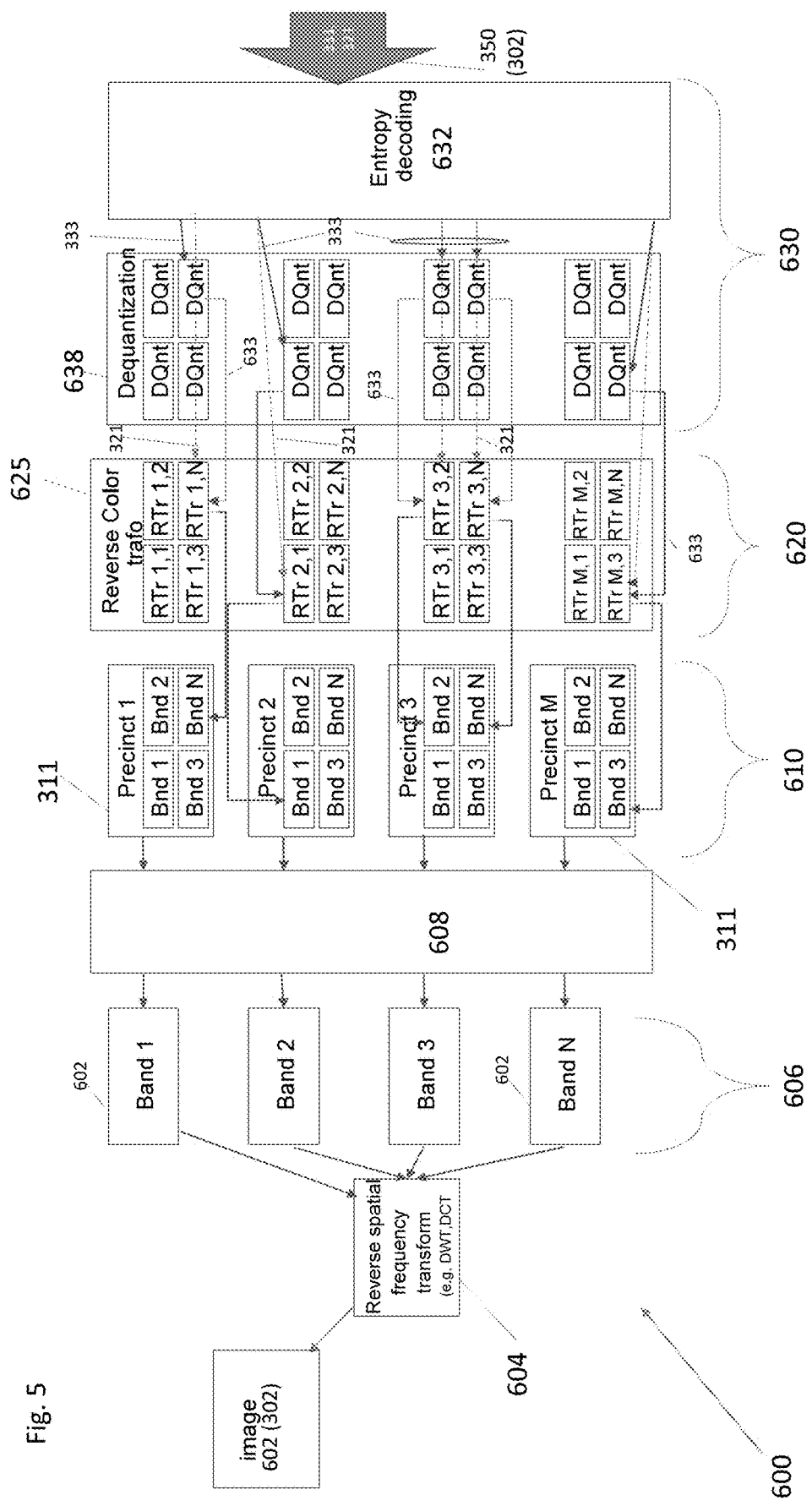
FIGS. 5 and 6 show a decoder according to an example.
Figure 6:
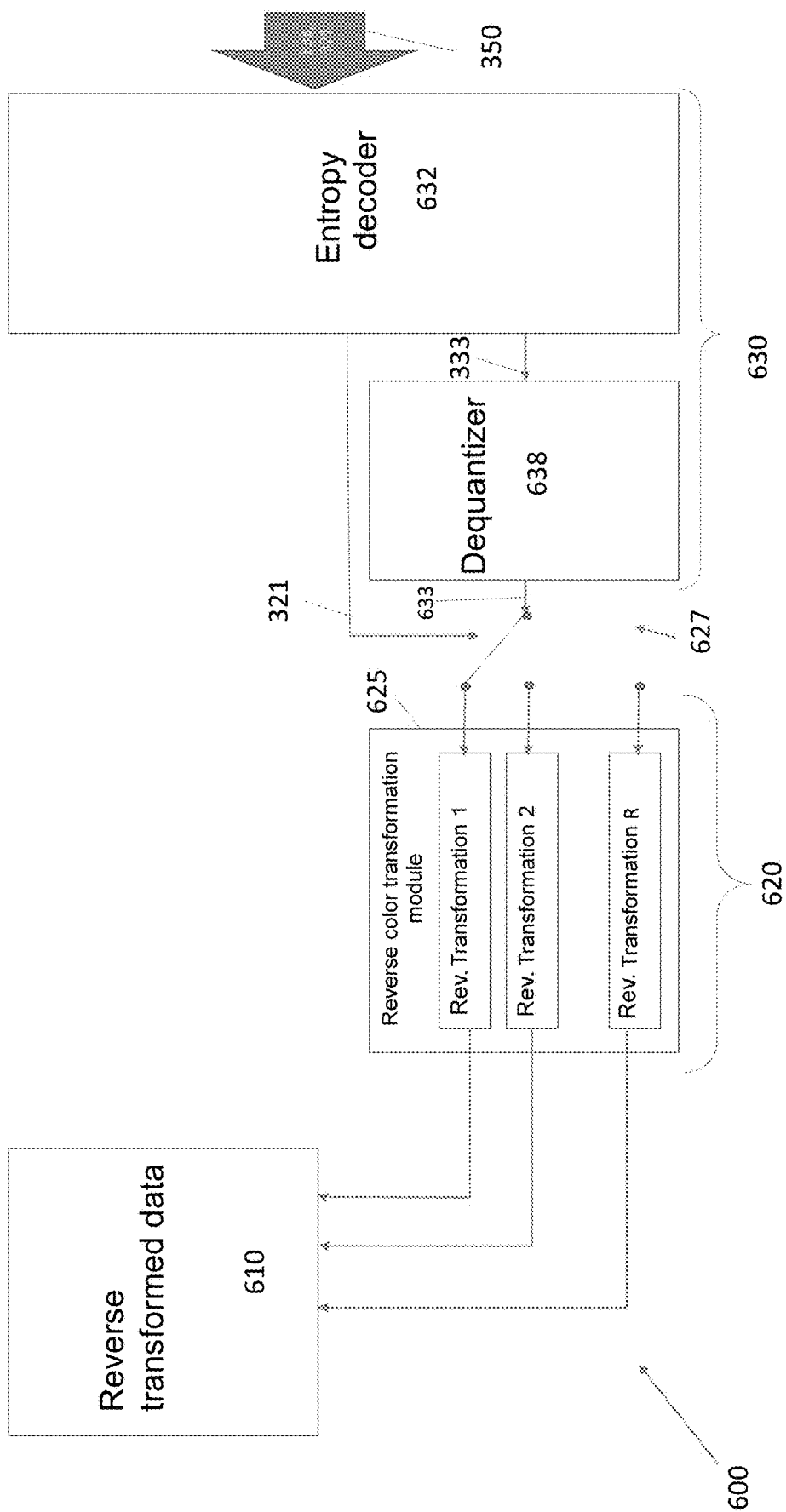

FIGS. 5 and 6 show a decoder 600 to decode a bitstream 350, which may be obtained through the encoder 300 above. As explained above, the bitstream 350 may include (encoded therein) or at least permit to obtain a quantized version 333 of the input image information 302 (more in detail, the quantized version 333 may be a quantized version of the spatially transformed and color transformed version 323 of the input image information 302). The bitstream 350 may comprise, signalled therein, information 321 on the selected transformation for each band or each group of bands (bandwise or groupwise) indicating, for each band or each group of bands, which is the chosen component transformation (e.g. the information 321 may include a particular information uniquely associated to one band of each precinct and each component, or may include information uniquely associated to one group of bands of one precinct in one component, for example).

The decoder 600 may include a decoding and dequantization stage 630. The decoding and dequantization stage 630 may entropy decode (e.g. through an entropy decoder 632), from the bitstream 350, the quantized version 333 of the image information 302. The decoding and dequantization stage 630 may perform a dequantization (638, DQnt), by dequantizing the quantized version 333 of the image information. There is therefore obtained a dequantized version 633 of the image information. The dequantized version 633 of the image information is in transform domain. The dequantized version 633 of the image information includes a plurality of components (e.g., one luma component and two chroma components), and is subdivided into a plurality of precincts 311, each precinct 311 having transform coefficients covering a predetermined spatial area of the input image information 302. The dequantization performed by the quantization stage 638 may be understood as the reverse operation than the quantization performed by the quantization stage 338 at the encoder 300. The dequantization at 638 may therefore be applied to each band 102' of each precinct 311, in a bandwise fashion. Therefore, to each band (or each group of bands) of each precinct there may be assigned one related reverse component transformation, while the other (non-selected) reverse component transformations may be deactivated for that band (or group of bands). A bandwise selection (or groupwise selection) may therefore be performed.

The dequantized version 633 of the image information is still in the component transformed space (e.g., luma/chroma), and it is intended to reverse transform it. The dequantized version 633 of the image information is for this purpose provided to a reverse component transformation stage 620. The reverse component transformation stage 620 may apply a particular reverse component transformation (RTr) to the dequantized version 633 of the image information, thereby converting dequantized version 633 of the image information from the component transformed space (e.g. luma/chroma) into a color component space (e.g., a primary color space based on coordinates relative to red, green and blue primary colors), to thereby obtain a reverse component transformed version 610 of the image information (in the cases where the identity transformation was performed at the encoder, then the reverse transformation is the identity transformation itself). Basically, for each band (or group of bands) of each precinct 311, there is selected the reverse component transformation which is the reversed transformation of the component transformation selected (at 327) by the component transformation stage 320. The selection is signalled in the information 321 and can therefore be univocally determined, and there is no need to perform a new estimation similar to that performed by the color transformation determination module 326 of the encoder 300: since each component transformation selected at the encoder 300 has a reverse component transformation associated therewith, the information 321 on the selected transformation also indicates which reverse component transformation (reverse color transformation) is to be used by the reverse component transformation stage 620. Since the component transformations (R,G,B→Y,Cb,Cr) (see above) used at the component transformation stage 320 of the encoder 300 are mostly obtained through linear combinations, the reverse linear combinations will be used at the reverse component transformation stage 620. The reverse component transformation may therefore be applied to each band (or group of bands) of each precinct, in a bandwise (or groupwise) fashion.

Similarly of what is foreseen for the encoder 300, in case a group (or a plurality of groups) of bands is defined for a precinct 311, then the information 321 on the selected transformation will apply to all the band of the group of bands, thus saving bitrate (a version of the decoder corresponding to the encoder of FIG. 7 is not shown).

FIG. 6 shows a view of elements of the decoder 600 in analogy to FIG. 4. The reverse component transformation stage 620 is represented as including a reverse component transformation module 625 (which may be considered to correspond to the component transformation module 325 of the encoder 300). It is noted that in FIG. 6 there is not a block corresponding to the (color) component transformation determination module 326, despite the presence of a selector 627 (which can be seen as corresponding to the selector 327 of the encoder 300): but in this case the selector 627 is controlled by the information 321 on the selected transformation. The "Rev. Transformation 1" is the reverse component transformation of the "Transformation 1" of FIG. 3; the "Rev. Transformation 2" is the reverse component transformation of the "Transformation 2" of FIG. 3; and the "Rev. Transformation R" is the reverse component transformation of the "Transformation R" of FIG. 3. These reverse component transformations are candidate reverse component transformations from which a selected reverse component transformation is chosen, while the other ones are discarded (deactivated). For each band and precinct, only one reverse component transformation is selected (the other component transformations remain deactivated). The reverse component transformation module 625 may perform the choice to each band (or group of bands) of each precinct, in a bandwise (or groupwise) fashion.

The reverse component transformed version 610 is still grouped in precincts 311. With reference to FIG. 5 again, a band reconstructor 608 may reconstruct the bands 602, to obtain a version 606 of the image information which is not divided into precincts, but only in bands 602.

The reverse component transformed version (in its version 606) of the image information may then be spatially reverse transformed at a reverse spatial transformation stage 604. The reverse spatial transformation stage 604 may adopt a reverse spatial decorrelation. The reverse spatial transformation may be an inverse discrete wavelet transformation (IDWT). The spatial transformation may be an inverse discrete sine transformation (IDST). The spatial transformation may be an inverse discrete cosine transformation (IDCT).

The image information 602 (which is a decoded version of the original image information 302) is therefore reconstructed. In those cases in which the original image information 302 is a spatial image (e.g. defined in pixels), then the image information is an image (e.g. matrix of pixels). In the cases the original image information 302 is a residual of a temporal prediction in a sequence of images, then the image information 602 is also a residual, and may be summed to a previously obtained image for generating the final image.

Figures 8A, 8B:
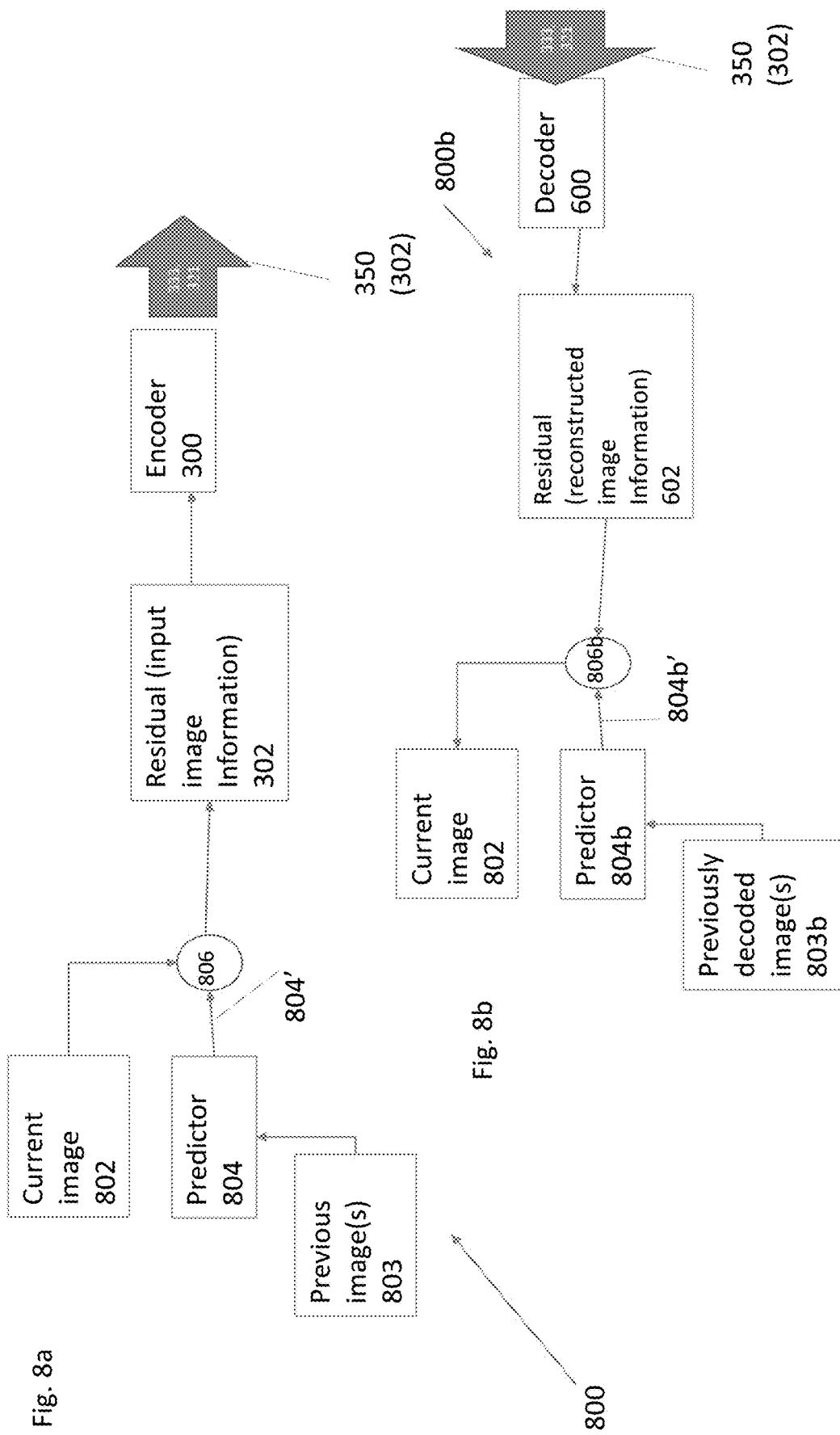
FIG. 8a shows an example of an apparatus for encoding a sequence of images.
FIG. 8b shows an example of an apparatus for decoding a sequence of images.

FIGS. 8a and 8b show the case in which the input image information 302 and the reconstructed image information 602 are residuals of predictions (e.g. for a sequence of images).

In particular FIG. 8a shows an apparatus 800 for encoding a sequence of images using e.g. the encoder 300 (the variant 700 may also be used). Previous images 803 (e.g. in the spatial domain) of the sequence (in forward or backward order) may be inputted to a predictor 804 (e.g. motion estimation unit) which may output a prediction 804'. The prediction 804' may be compared with the current image (e.g. in the spatial domain) at the residual formation block 806. The result of the comparison (residual) may be provided as input image information 302 to the encoder 300, so as to generate the bitstream 350 as discussed above.

FIG. 8b shows an apparatus 800b for decoding a sequence of images using e.g. the decoder 300 as disused above. The bitstream 350 may be decoded, to obtain the residual (which is the reconstructed image information 602). In parallel, previously decoded images 803b of the sequence (in forward or backward order) may be inputted to a predictor 804b. The predictor 804b (motion estimation unit) may use the same model used by the predictor 804 at the encoder side. The predictor 804b may generate a prediction 804b'. At a residual combiner block 806b, the prediction 804b' may be added to the residual 602, so as to obtain the current image 802 in the sequence.

In all the examples above, the bitstream 350 may be transmitted from the encoder (or the apparatus for encoding the sequence of images) to the decoder (or the apparatus for decoding the sequence of images), e.g., through wired connections (e.g. through electric signals), and/or wireless signals (e.g. optical signals and or radio frequency signals). Notably, the encoder may be part of a streaming server device (or the apparatus for encoding the sequence of images), and the decoder (or the apparatus for decoding the sequence of images) may be part of a streaming client device.

In examples, the encoder 300 or 700 or the apparatus 800 may store the bitstream 350 onto a storage unit (e.g., hard disk, floppy disc, flash memory, etc.). In examples, the decoder 600 or the apparatus 800b may read the bitstream 350 from a storage unit (e.g., hard disk, floppy disc, flash memory, etc.), which may be the same of the storage unit on which the bitstream 350 has been written, or one onto which the bitstream 350 has been copied.

In examples, the encoder and the decoder may be incorporated in the same system, while in some examples the encoder and the decoder are in different systems.

The encoder (or the apparatus for encoding the sequence of images) may comprise (or be connected in input to) an image acquiring device (e.g. a frame grabber receiving input from a computer system, a video camera, such as a webcam).

The encoder (or the apparatus for encoding the sequence of images) may comprise or be connected to an image information generator. An example is in FIG. 9a, where an image information generator system 900 is shows to include an image information generator 902 (which may be, for example, controlled by a human user for generating an artificial image (e.g. for screen content, computer art, etc.). The input image information 302 may be generated, either as single image, or as part of a sequence of images (in the latter case, the image information generator 902 may include, or be connected to, the predictor 804 and the residual former block 806 in some examples). Then the input image information 302 may be processed by the encoder 300 (e.g. in its version 700) to obtain the bitstream.

The decoder may or be part of an image information rendering system 900b. The image information rendering system 900b may include the decoder 600 and an image information renderer 902b. In the cases in which the image information 602 is an image, the image information renderer 902b may be a display. In the cases in which the image information 602 is a residual, the image information renderer 902b may include (or be connected to) the predictor 804 and/or the predictor 804b and/or the residual combiner block 806b. The image information rendering system 900b and/or the image information renderer 902b may comprise, or connected to, or be part of, a video renderer, so as for a digital television system, and or for a computer rendering system.

Examples above also refer to a method for encoding an input image information (302) into a bitstream (350) (e.g., through the encoder 300 or its variant 700). The method may comprise:

a spatial transformation step, of transforming the input image information (302) from a spatial domain onto a transform domain, to obtain a spatially transformed version (306) of the input image information (302) having multiple transform coefficients;

a precinct generator step, of generating precincts (311), each precinct (311) having transform coefficients covering a predetermined spatial area of the input image information (302);

a component transformation step, of applying one component transformation (CTr), selected (327) out of a plurality of predetermined component transformations, to each band (102') of each precinct (311), to obtain a spatially transformed and color transformed version (323) of the input image information (302);

a quantization and coding step, of quantizing (338) the spatially transformed and color transformed version (323) of the input image information (302), to obtain a quantized version (333) of the spatially transformed and color transformed version of the input image information (302), and encoding the quantized version (333) of the spatially transformed and color transformed version (323) of the input image information (302) into a bitstream (350) through entropy coding (332), and signalling, in the bitstream (350), information (321) on the selected transformation for each band.

The selection of the selected component transformation may be a step of the method.

Examples above also refer to a method for decoding (e.g. performed by the decoder 600) an image information (602, 302) from a bitstream (350) (e.g. bitstream 350 being generated by the encoder 300 and/or by the encoding method above). The method may comprise:

a decoding and dequantization step (e.g. 630), of entropy decoding (632), from the bitstream (350), a quantized version of the image information, and performing a dequantization (638, DQnt), to obtain a dequantized version (633) of the image information (302, 602) (the dequantized version (633) of the image information (302, 602) is in transform domain, and includes a plurality of components, and is subdivided into a plurality of precincts (311), each precinct (311) having transform coefficients covering a predetermined spatial area of the input image information (302));

a reverse component transformation step of applying one reverse component transformation (RTr), to each band of each precinct (311), to obtain a reverse component transformed version (610) of the image information (302, 602), the reverse component transformation (RTr) being selected (627) out of a plurality of predetermined reverse component transformations based on information (321) on the selected transformation signalled in the bitstream (350); and a reverse spatial transformation step (604) of transforming the reverse component transformed version (610) of the image information (302, 602) onto a reconstructed spatial image information (602).

It is here mentioned also a non-transitory storage unit storing instructions which, when executed by a computer, cause the computer to perform one of the methods above and/or to control one of the encoder and/or decoder above.

These methods (e.g. encoding method, decoding method) may be, in some examples, computer implemented methods.

As can be seen from above, with the present examples there is the possibility for choosing, for each band 102' of each precinct 311 (or at least for each group of bands of each precinct) the most appropriate component transformation.

In the present figures, some simplifications have been used. For example, in FIGS. 3, 5, 7, the number of connections from the precincts towards the component transformation and the number of connections from the component transformation to the quantization instances has been reduced for simplicity.

Discussion

Unlike conventional designs, the proposed implementation performs, at the encoder 300, color decorrelation 325 after spatial decorrelation 304 but before quantization and rate allocation (stage 330); in particular, a discrete wavelet transformation ("DWT") or another transformation may be applied as first step (304), creating a cascade of wavelet bands such as seen in FIG. 3, and color decorrelation 325 is applied within these bands 102', after grouping the data into precincts 311. (At the decoder 600: the proposed implementation performs color decorrelation 625 before reverse spatial decorrelation 604 but after entropy decoding and dequantization (stage 630); in particular, an inverse discrete wavelet transformation ("DWT") or another reverse transformation may be applied as last step (304) on wavelet bands.)

The color transformation 320 may include (for each color component) two modules: A color transformation determination module 326, and the actual transformation (color transformation module) 325. The determination module 326 may predict and/or test multiple candidate transformations, and from it, estimates the rate each candidate transformation would create. The determination module 326 may then select (327) for each band 102' and each precinct 311 the transformation with the lowest achievable rate, and apply it to the data. The information 321 on which color transformation has been selected is written by the entropy coder 332 into the output bitstream 350. This process is outlined in FIG. 4. (At the decoder 600: there is not a color transformation determination module 326, but there is a reverse color transformation module 625, which is driven by the information 321 on which color transformation has been selected written in the bitstream 350).

It has been noted that these operations can require side information (321) and thus costs rate by itself, it has been understood that sometimes it can be of advantage to lower the bitrate by defining color transformations for some bands jointly (e.g. like in FIG. 7), i.e. enforce that certain bands 102' use the same color transformation. In such a case, the color transformation determination module 326 may estimate the sum of the rate contributions (bitrate contributions) from each band 102', and determine from this sum which color transformation to use for the bands jointly (i.e. for a group of bands). This process, in which several bands 102' share the same color transformation, is depicted in FIG. 7. The decoder will simply take into consideration the information 321 on the selected transformation of the entire group of bands.

FURTHER IMPLEMENTATIONS

Generally, examples may be implemented as a computer program product with program instructions, the program instructions being operative for performing one of the methods when the computer program product runs on a computer. The program instructions may for example be stored on a machine readable medium.

Other examples comprise the computer program for performing one of the methods described herein, stored on a machine-readable carrier.

In other words, an example of method is, therefore, a computer program having program instructions for performing one of the methods described herein, when the computer program runs on a computer.

A further example of the methods is, therefore, a data carrier medium (or a digital storage medium, or a computer-readable medium) comprising, recorded thereon, the computer program for performing one of the methods described herein. The data carrier medium, the digital storage medium or the recorded medium are tangible and/or non-transitionary, rather than signals which are intangible and transitory.

A further example of the method is, therefore, a data stream or a sequence of signals representing the computer program for performing one of the methods described herein. The data stream or the sequence of signals may for example be transferred via a data communication connection, for example via the Internet.

A further example comprises a processing means, for example a computer, or a programmable logic device performing one of the methods described herein.

A further example comprises a computer having installed thereon the computer program for performing one of the methods described herein.

A further example comprises an apparatus or a system transferring (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some examples, a programmable logic device (for example, a field programmable gate array) may be used to perform some or all of the functionalities of the methods described herein. In some examples, a field programmable gate array may cooperate with a microprocessor in order to perform one of the methods described herein. Generally, the methods may be performed by any appropriate hardware apparatus.

The above described examples are merely illustrative for the principles discussed above. It is understood that modifications and variations of the arrangements and the details described herein will be apparent. It is the intent, therefore, to be limited by the scope of the impending claims and not by the specific details presented by way of description and explanation of the examples herein.

Equal or equivalent elements or elements with equal or equivalent functionality are denoted in the following description by equal or equivalent reference numerals even if occurring in different figures.

While the present technique has been described in terms of several examples, there are alterations, permutations, and equivalents which fall within the scope of this disclosure. It should also be noted that there are many alternative ways of implementing the methods and compositions of the present technique. It is therefore intended that the following appended claims be interpreted as including all such alterations, permutations and equivalents as fall within the true spirit and scope of the present disclosure.

The invention claimed is:

1. A decoder for decoding an image information from a bitstream in which a version of the image information in color space selected among at least a primary color space and an opponent color space is encoded, the decoder comprising:
 a decoding and dequantization stage, to entropy decode, from the bitstream, a quantized version of the image information in the selected color space and to perform a dequantization, to obtain a dequantized version of the image information in the selected color space, wherein the dequantized version of the image information is in transform domain, and includes a plurality of components, and is subdivided into a plurality of precincts, each precinct comprising transform coefficients covering a predetermined spatial area of the image information in the selected color space;
 a reverse component transformation stage, to select for, and apply to, each band or group of bands of each precinct, one reverse component transformation from the selected color space to the primary color space, to obtain a reverse component transformed version of the image information in the primary color space, the reverse component transformation stage selecting the reverse component transformation out of a plurality of predetermined reverse component transformations based on information on the selected component transformation signalled in the bitstream, the plurality of predetermined reverse component transformations including at least one reverse component transformation from the opponent color space onto the primary color space and at least one component transformation from the primary color space to another, or the same, primary color space; and
 a reverse spatial transformation stage to transform the reverse component transformed version of the image information onto a reconstructed spatial image information.

2. The decoder of claim 1, wherein a first group of bands includes one DC band, and a second group of bands includes all the other bands.

3. The decoder of claim 1, wherein the reverse spatial transformation stage is configured to perform an inverse discrete wavelet transformation (IDWT), an inverse discrete cosine transformation (IDCT), or inverse discrete sine transformation (IDST) for the reverse component transformed version of the image information in the primary color space for each component.

4. The decoder of claim 1, wherein the color space relative to primary colors has red, green and blue colors as primary colors.

5. The decoder of claim 1, wherein the plurality of predetermined reverse component transformations include at least one identity transformation transforming from the primary color space to the same primary color space.

6. The decoder of claim 1, wherein the reconstructed spatial image information in the primary color space, as obtained by the reverse spatial transformation stage, is an image or a tile of an image.

7. The decoder of claim 1, wherein the reconstructed spatial image information in the primary color space, as obtained by the reverse spatial transformation stage, is a residual of a temporal prediction in a sequence of images.

8. An encoder for encoding an input image information in a primary color space into a bitstream, the encoder comprising:
 a spatial transformation stage, to transform the input image information in the primary color space from a spatial domain onto a transform domain, to obtain a spatially transformed version of the input image information in the primary color space having multiple bands and, for each band, multiple transform coefficients;
 a precinct generator, to generate precincts, each precinct comprising transform coefficients covering a predetermined spatial area of the input image information in the primary color space;
 a component transformation stage, to select for, and apply to, each band or group of bands of each precinct, one component transformation; selected out of a plurality of predetermined component transformations including at least one component transformation from the primary color space onto an opponent color space and at least one component transformation from the primary color space to another, or the same, primary color space, to obtain a spatially transformed and color transformed version of the input image information in a selected color space selected between the opponent color space and the primary color space;
 a quantization and coding stage, to quantize the spatially transformed and color transformed version of the input image information in the selected color space, to obtain a quantized version of the spatially transformed and color transformed version of the input image information in the selected color space, and to encode the quantized version of the spatially transformed and color transformed version of the input image information in the selected color space into a bitstream through an entropy coder, and to signal, in the bitstream, information on the selected component transformation for each band or group of bands.

9. The encoder of claim 8, wherein the component transformation stage is configured to select the component transformation out of the plurality of predetermined component transformations by predictively estimating the quantization for different predetermined component transformations, the selected component transformation being, according to a result of the predictively estimating, the component transformation which minimizes the bitrate for the band, or group of bands.

10. The encoder of claim 8, wherein the component transformation stage is configured to generate at least one group of bands for one precinct, and to select the component transformation out of the plurality of predetermined component transformations by predictively estimating the quantization for different predetermined component transformations, the selected component transformation being, according to a result of the predictively estimating, the component transformation which minimizes the bitrate for the group of bands.

11. The encoder of claim 10, wherein a first group of bands includes one DC band, and a second group of bands includes all the other bands.

12. The encoder of claim 10, wherein the component transformation stage is configured to predictively estimate bitrate contributions of multiple bands of the same group for different component transformations, and to select the component transformation based on the sum of the bitrate contributions of the multiple bands.

13. The encoder of claim 8, configured to perform a discrete wavelet transformation (DWT), discrete cosine transformation (DCT), or discrete sine transformation (DST) to each of the components of the input image information in the primary color space.

14. The encoder of claim 8, wherein the primary color space has red, green and blue colors as primary colors.

15. The encoder of claim 8, wherein the plurality of predetermined component transformations includes at least one identity transformation transforming from the primary color space to the same primary color space.

16. The encoder of claim 8, wherein the input image information in the primary color space is an image or a rectangular region of an image.

17. The encoder of any of claim 8, wherein the input image information in the primary color space is a residual of a temporal prediction in a sequence of images.

18. A method for decoding an image information from a bitstream in which a version of the image information in color space selected among at least a primary color space and an opponent color space is encoded, the method comprising:
 a decoding and dequantization step, comprising entropy decoding, from the bitstream, a quantized version of the image information in the selected color space, and performing a dequantization, to obtain a dequantized version of the image information in the selected color space, wherein the dequantized version of the image information is in transform domain, and includes a plurality of components, and is subdivided into a plurality of precincts, each precinct having transform coefficients covering a predetermined spatial area of the image information in the selected color space;
 a reverse component transformation step, comprising selecting for, and applying to, each band or group of bands, of each precinct, one reverse component transformation from the selected color space to the primary color space to obtain a reverse component transformed version of the image information, the reverse component transformation step selecting the reverse component transformation out of a plurality of predetermined reverse component transformations based on information on the selected component transformation signalled in the bitstream, the plurality of predetermined reverse component transformations including at least one reverse component transformation from the opponent color space onto the primary color space and at least one component transformation from the primary color space to another, or the same, primary color space; and
 a reverse spatial transformation step comprising transforming the reverse component transformed version of the image information onto a reconstructed spatial image information.

19. A non-transitory storage unit storing instructions which, when executed by a computer, cause the computer to perform:
 a decoding and dequantization step, comprising entropy decoding, from a bitstream in which a version of an image information in color space selected among at least a primary color space and an opponent color space is encoded, a quantized version of the image information in the selected color space, and performing a dequantization, to obtain a dequantized version of the image information in the selected color space, wherein the dequantized version of the image information is in transform domain, and includes a plurality of components, and is subdivided into a plurality of precincts, each precinct comprising transform coefficients covering a predetermined spatial area of the image information in the selected color space;
 a reverse component transformation step, comprising selecting for, and applying to, each band or group of bands of each precinct, one reverse component transformation, to obtain a reverse component transformed version of the image information in the primary color space, the reverse component transformation being selected out of a plurality of predetermined reverse component transformations based on information on the selected component transformation signalled in the bitstream, the plurality of predetermined reverse component transformations including at least one reverse component transformation from the opponent color space onto the primary color space and at least one component transformation from the primary color space to another, or the same, primary color space; and
 a reverse spatial transformation step comprising transforming the reverse component transformed version of the image information onto a reconstructed spatial image information.

20. A method for encoding an input image information in a primary color space into a bitstream, the method comprising:
 a spatial transformation step, comprising transforming the input image information in the primary color space from a spatial domain onto a transform domain, to obtain a spatially transformed version of the input image information in the primary color space having multiple bands and, for each band, multiple transform coefficients;
 a precinct generator step, comprising generating precincts, each precinct having transform coefficients covering a predetermined spatial area of the input image information in the primary color space;
 a component transformation step, comprising selecting for, and applying to, each band, or group of bands, of each precinct, one component transformation selected out of a plurality of predetermined component transformations including at least one component transformation from the primary color space onto the opponent color space and at least one component transformation from the primary color space to another, or the same, primary color space, to obtain a spatially transformed and color transformed version of the input image information in a selected color space selected between the opponent color space and the primary color space;

a quantization and coding step, comprising quantizing the spatially transformed and color transformed version of the input image information in the selected color space, to obtain a quantized version of the spatially transformed and color transformed version of the input image information in the selected color space, and encoding the quantized version of the spatially transformed and color transformed version of the input image information in the selected color space into a bitstream through entropy coding, and signalling, in the bitstream, information on the selected component transformation for each band, or group of bands.

21. A non-transitory storage unit storing instructions which, when executed by a computer, cause the computer to perform:
- a spatial transformation step, comprising transforming an input image information in a primary color space from a spatial domain onto a transform domain, to obtain a spatially transformed version of the input image information in the primary color space having multiple bands and, for each band, multiple transform coefficients;
- a precinct generator step, comprising generating precincts, each precinct comprising transform coefficients covering a predetermined spatial area of the input image information;
- a component transformation step, comprising selecting for, and applying to, each band or group of bands of each precinct, one component transformation, selected out of a plurality of predetermined component transformations including at least one component transformation from the primary color space onto an opponent color space and at least one component transformation from the primary color space to another, or the same, primary color space, to obtain a spatially transformed and color transformed version of the input image information in a selected color space selected between the opponent color space and the primary color space;
- a quantization and coding step, comprising quantizing the spatially transformed and color transformed version of the input image information in the selected color space, to obtain a quantized version of the spatially transformed and color transformed version of the input image information in the selected color space, and encoding the quantized version of the spatially transformed and color transformed version of the input image information in the selected color space into a bitstream by entropy coding, and signalling, in the bitstream, information on the selected component transformation for each band, or group of bands.

\* \* \* \* \*